US009149054B2

(12) United States Patent
Manner et al.

(10) Patent No.: US 9,149,054 B2
(45) Date of Patent: *Oct. 6, 2015

(54) PREFIX-BASED LEAF NODE STORAGE FOR DATABASE SYSTEM (75) Inventors: Markku J. Manner, Helsinki (FI); Simo A. Neuvonen, Espoo (FI); Vilho T. Raatikka, Espoo (FI)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/462,815

(22) Filed: May 3, 2012

(65) Prior Publication Data
US 2013/0013890 A1    Jan. 10, 2013

Related U.S. Application Data (63) Continuation of application No. 13/421,885, filed on Mar. 16, 2012.

(30) Foreign Application Priority Data
Jul. 6, 2011 (EP) .................................... 11172837

(51) Int. Cl.
G06F 17/30 (2006.01)
A23G 1/00 (2006.01)

(52) U.S. Cl.
CPC ........ *A23G 1/0066* (2013.01); *G06F 17/30501* (2013.01)

(58) Field of Classification Search
CPC .................... G06F 17/30312; G06F 17/30501; A23G 1/0066
USPC .......................... 707/737, 999.1, 736; 711/207
See application file for complete search history.

(56) References Cited

U.S. PATENT DOCUMENTS

| 6,226,634 B1 | 5/2001 | Ogihara et al. |
| 6,249,788 B1 * | 6/2001 | Ronstrom ............................. 1/1 |
| 6,522,632 B1 * | 2/2003 | Waters et al. .................. 370/254 |
| 6,859,808 B1 * | 2/2005 | Chong et al. .................. 707/741 |
| 7,065,537 B2 | 6/2006 | Cha et al. |

(Continued)

OTHER PUBLICATIONS

Camargos, Lasaro, et al., "On-Demand Recovery in Middleware Storage Systems". 29th IEEE Symposium on Reliable Distributed Systems (SRDS 2010), New Delhi, Punjab, India, Oct. 31-Nov. 3, 2010. pp. 204-213.

(Continued)

*Primary Examiner* — Miranda Le
(74) *Attorney, Agent, or Firm* — Marcia L. Doubet (57) ABSTRACT

Operating a database system comprises: storing a database table comprising a plurality of rows, each row comprising a key value and one or more attributes; storing a primary index for the database table, the primary index comprising a plurality of leaf nodes, each leaf node comprising one or more key values and respective memory addresses, each memory address defining the storage location of the respective key value; creating a new leaf node comprising one or more key values and respective memory addresses; performing a memory allocation analysis based upon the lowest key value of the new leaf node to identify a non-full memory page storing a leaf node whose lowest key value is similar to the lowest key value of the new leaf node; and storing the new leaf node in the identified non-full memory page.

7 Claims, 8 Drawing Sheets

(56) References Cited

U.S. PATENT DOCUMENTS

| | | | |
|---|---|---|---|
| 7,146,371 B2* | 12/2006 | Hofstee et al. | 1/1 |
| 7,251,663 B1* | 7/2007 | Smith | 1/1 |
| 7,296,139 B1* | 11/2007 | Case et al. | 711/209 |
| 7,363,284 B1* | 4/2008 | Plasek et al. | 1/1 |
| 7,539,153 B1* | 5/2009 | Liang et al. | 370/255 |
| 7,587,429 B2 | 9/2009 | Liedes et al. | |
| 7,725,440 B2 | 5/2010 | Reed et al. | |
| 7,797,296 B2 | 9/2010 | Cha et al. | |
| 7,809,736 B2 | 10/2010 | Greenwald et al. | |
| 7,895,164 B1* | 2/2011 | Varadarajan et al. | 707/649 |
| 8,108,355 B2* | 1/2012 | Zhang | 707/673 |
| 8,151,060 B2 | 4/2012 | Mizushima | |
| 8,224,780 B2* | 7/2012 | Cargille et al. | 707/648 |
| 8,332,410 B2* | 12/2012 | Shinjo et al. | 707/745 |
| 8,352,705 B2 | 1/2013 | Agesen | |
| 8,417,885 B2* | 4/2013 | Chou et al. | 711/112 |
| 8,527,546 B2 | 9/2013 | Raatikka | |
| 8,543,613 B2 | 9/2013 | Raatikka | |
| 2002/0087500 A1* | 7/2002 | Berkowitz et al. | 707/1 |
| 2002/0184231 A1* | 12/2002 | Baskins et al. | 707/102 |
| 2003/0061189 A1* | 3/2003 | Baskins et al. | 707/1 |
| 2003/0217080 A1 | 11/2003 | White et al. | |
| 2004/0139127 A1 | 7/2004 | Pofelski | |
| 2004/0243553 A1* | 12/2004 | Bailey | 707/3 |
| 2004/0260726 A1* | 12/2004 | Hrle et al. | 707/104.1 |
| 2005/0010564 A1* | 1/2005 | Metzger et al. | 707/3 |
| 2005/0027743 A1* | 2/2005 | O'Neil et al. | 707/104.1 |
| 2005/0071379 A1* | 3/2005 | Kekre et al. | 707/200 |
| 2006/0004860 A1 | 1/2006 | Liedes et al. | |
| 2006/0047925 A1* | 3/2006 | Perry | 711/162 |
| 2006/0101033 A1 | 5/2006 | Hu et al. | |
| 2007/0118547 A1* | 5/2007 | Gupta et al. | 707/101 |
| 2007/0192384 A1* | 8/2007 | Shodhan et al. | 707/202 |
| 2007/0220356 A1 | 9/2007 | Ruscio et al. | |
| 2008/0091704 A1* | 4/2008 | Yennie | 707/102 |
| 2008/0168077 A1 | 7/2008 | Barsness et al. | |
| 2008/0275872 A1 | 11/2008 | Venkatachary et al. | |
| 2009/0012976 A1* | 1/2009 | Kang et al. | 707/100 |
| 2009/0077076 A1* | 3/2009 | Berger et al. | 707/6 |
| 2009/0083339 A1 | 3/2009 | Reed et al. | |
| 2009/0307184 A1* | 12/2009 | Inouye et al. | 707/2 |
| 2009/0307277 A1 | 12/2009 | Grubov et al. | |
| 2010/0011026 A1 | 1/2010 | Saha et al. | |
| 2010/0031000 A1* | 2/2010 | Flynn et al. | 711/216 |
| 2010/0042597 A1 | 2/2010 | Shinjo et al. | |
| 2010/0131700 A1* | 5/2010 | Castillo | 711/103 |
| 2010/0199027 A1 | 8/2010 | Pucheral et al. | |
| 2010/0235335 A1* | 9/2010 | Heman et al. | 707/703 |
| 2010/0246446 A1* | 9/2010 | Du et al. | 370/256 |
| 2011/0125968 A1* | 5/2011 | Kessler et al. | 711/123 |
| 2011/0138123 A1* | 6/2011 | Gurajada et al. | 711/118 |
| 2011/0153979 A1* | 6/2011 | Boyle | 711/209 |
| 2012/0066263 A1* | 3/2012 | Wildermuth | 707/792 |
| 2012/0109895 A1* | 5/2012 | Zwilling et al. | 707/648 |
| 2012/0136901 A1 | 5/2012 | Raatikka | |
| 2012/0166490 A1 | 6/2012 | Raatikka | |
| 2012/0323971 A1* | 12/2012 | Pasupuleti | 707/802 |
| 2013/0013602 A1 | 1/2013 | Manner et al. | |

OTHER PUBLICATIONS

Xiong, Ying, et al., "Memory Integrity Verification Speedup Using Separated L2 Hash code". Proc. of Theoretical and Applied Computer Science (TACS), Stillwater, OK, Nov. 2010. pp. 1-6.

Lee, Ig-hoon, et al., "A Snappy B+-Trees Index Reconstruction for Main-Memory Storage System". Computational Science and Its Applications—ICCSA 2006, International Conference, Glasgow, UK, May 8-11, 2006, Proceedings, Part I. pp. 1036-1044.

Goyal, Prof. Navneet, "Crash Recovery". Department of Computer Science & Information Systems, BITS, Pilani. Sep. 2008. 40 pages.

Markku J. Manner et al., U.S. Appl. No. 13/421,885, filed Mar. 16, 2012, Office Action, Jan. 10, 2013, 10 pages.

Markku J. Manner et al., U.S. Appl. No. 13/421,885, filed Mar. 16, 2012, Office Action, Apr. 23, 2013, 14 pages.

Xiongpai, Qin, et al., "Performance study on logging to another main memory database", 4th International Conference on New Trends in Information Science and Service Science (NISS), IEEE 2010, May 11-13, 2010, pp. 36-40.

Xiongpai, Qin, et al., "Simulation of main memory database parallel recovery", Proceedings of the 2009 Spring Simulation Multiconference, SpringSim 2009, San Diego, California, USA, Mar. 22-27, 2009. ACM 2009, Article No. 103.

Markku J. Manner et al., U.S. Appl. No. 13/421,885, filed Mar. 16, 2012, Office Action, Jul. 3, 2014, 17 pages.

Markku J. Manner et al., U.S. Appl. No. 13/421,885, filed Mar. 16, 2012, Office Action, Oct. 23, 2014, 15 pages.

* cited by examiner

PREFIX-BASED LEAF NODE STORAGE FOR DATABASE SYSTEM

BACKGROUND

The present invention relates to operating a database system and to the database system itself. In one embodiment, the invention provides a prefix-based memory allocator for paged leaf nodes of a search tree.

In database systems, a checkpoint is an administrative operation in which a database image is persistently stored for use in a possible future recovery of a shut down, or a failed server. In in-memory databases, a database image (a checkpoint image) is also instrumental in starting up the database server, because all the data has to be loaded into memory. Depending upon the implementation specifics, a checkpoint image may consist of complete indexes and storage pages (storing the user data), or may consist of storage pages only, or may consist of something between those two extremes. If the indexes are not included in the checkpoint image, they are called transient indexes, and they need to be recreated when the database is restored from a checkpoint image.

The user data may be envisaged as a collection of database table rows and are commonly referred to as tuples. The tuples are pointed to by index entries using direct pointers. During a database checkpoint, the tuples are copied to page-sized memory buffers ("checkpoint buffer") for a disk write. When an in-memory database engine is started, all data is read from a checkpoint image stored on secondary storage, typically a hard disk. Client requests can be served as soon as the data (the database rows) becomes accessible in the main memory. In an in-memory database engine, user data and the necessary navigation information (indexes) need to be present. If indexes are transient, the rows are re-inserted into the database and, in addition, the indexes are re-created. Alternatively, if the checkpoint includes necessary navigation information within the image, it is possible to read data from the checkpoint so that the server can be opened instantaneously, and user data can be restored based on the client's needs.

The first option is becoming useless due to ever-increasing memory usage and corresponding database sizes. In practical database implementations, the reading of an entire checkpoint image to memory can last several hours. The second solution refers to necessary navigation information. That is, row pointers of indexes are useless because the rows are likely to be positioned in different memory locations when they are restored from the checkpoint. Thus, address translation is needed so that row pointers can be redirected to correct locations of the rows in the checkpoint image. Excluding transient indexes from a checkpoint greatly simplifies, and speeds up, checkpoint creation. The downside is that the possibility of rapidly finding individual rows from a large checkpoint image is impossible.

BRIEF SUMMARY

An embodiment of the present invention is directed to operating a database system, comprising: storing a database table comprising a plurality of rows, each row comprising a key value and one or more attributes; storing a primary index for the database table, the primary index comprising a plurality of leaf nodes, each leaf node comprising one or more key values and respective memory addresses, each memory address defining the storage location of the respective key value; creating a new leaf node comprising one or more key values and respective memory addresses; performing a memory allocation analysis based upon the lowest key value of the new leaf node to identify a non-full memory page storing a leaf node whose lowest key value is similar to the lowest key value of the new leaf node; and storing the new leaf node in the identified non-full memory page.

Embodiments of the present invention may be provided as methods, systems, and/or computer program products, and will now be described, by way of example only, with reference to the accompanying drawings, in which:

DETAILED DESCRIPTION

Owing to an embodiment of the present invention, it is possible to provide a database system that can be applied to database engines that use transient indexes, but provides means to locate individual rows from a checkpoint image in a much faster time compared to the time required for a full checkpoint image load. The effect of the invention is that instead of 1 to 10 hour start-up time with large database sizes, the database engine can start up in less than a minute, and be ready to serve client requests at the speed of commodity disk-based database engines. An embodiment of the invention makes it possible to find a leaf node of a database index from secondary storage, among millions of nodes, by reading less than 10% of the nodes (10% being the worst case scenario). The necessary navigation information is collected while leaf nodes are copied to the checkpoint image, and the invention generates no noticeable processing overhead in creation time for the checkpoint image.

Being able to find index leaf nodes quickly provides numerous advantages. For example, an in-memory database server which uses transient indexes (where indexes are not checkpointed) with a very large database can be opened for client requests in less than a minute compared to the several hours that it takes if the database has to be loaded into memory before opening the database. After a few minutes, an embodiment of the invention provides an average performance that is comparable to commodity disk-based database engine. The checkpoint operation is arranged so that the leaf nodes of indexes are included in checkpoint images. Thus, a checkpoint image will consist of a small amount of navigation information, called a leaf page index, to address the disk pages where leaf nodes are stored, leaf pages that include leaf nodes, and database contents.

In order to create a checkpoint image as described above, a new memory allocation scheme for leaf nodes is introduced. Every new leaf node needs memory, and that is requested from a memory allocator which then returns the address of a memory location where a new leaf node can be created. The memory allocator has several pools of memory (pre-allocated from the operating system), and chooses a location for every new leaf node by using a criteria (described in detail below). As a consequence, those leaf nodes that include keys which are close to each other by value will end up in memory areas from the same pool. In other words, the memory allocator loosely classifies leaf nodes so that they will be included in the checkpoint close to each other, thus making it possible to easily find all similar values by examining only a few disk pages in the checkpoint image.

Figure 1:
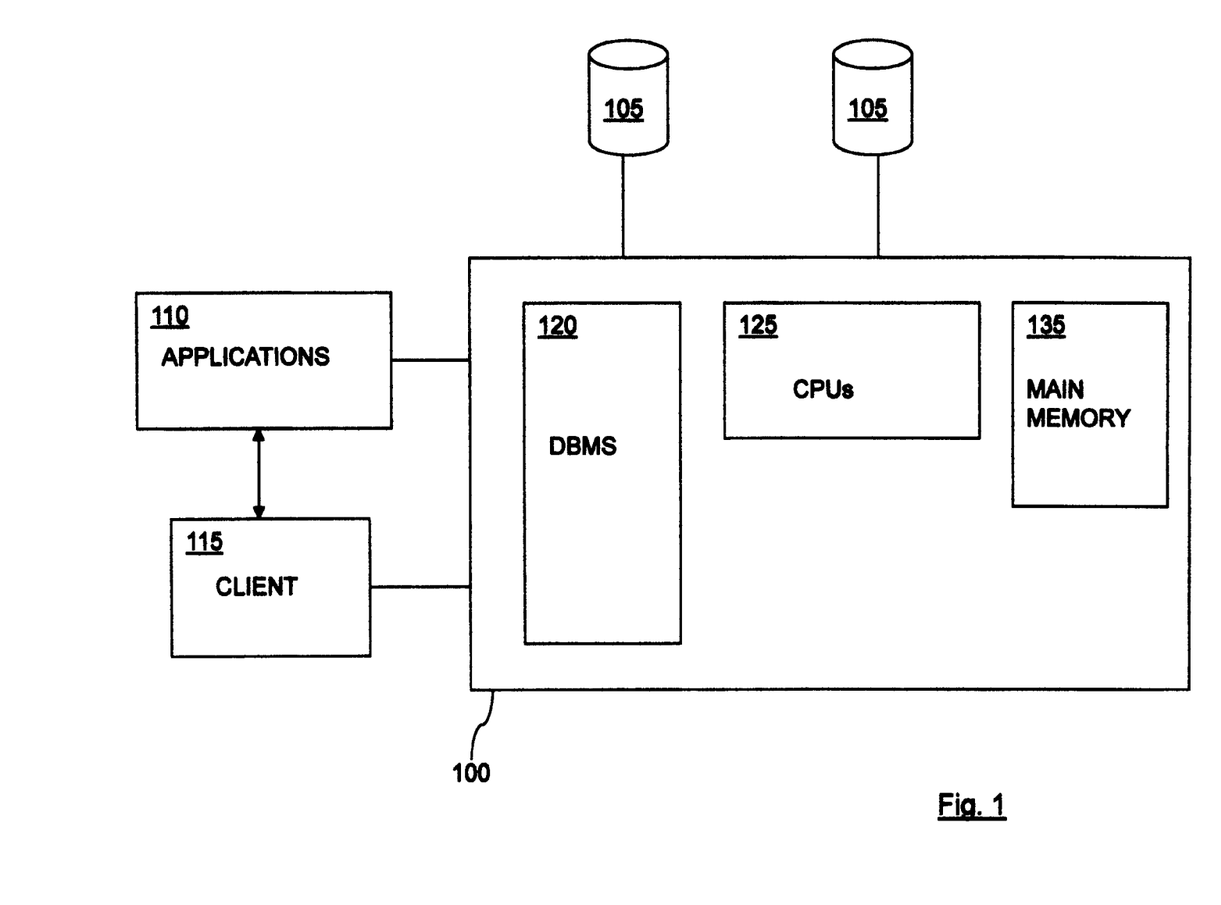
FIGS. 1 and 2 are schematic diagrams of a database system.
Figure 2:
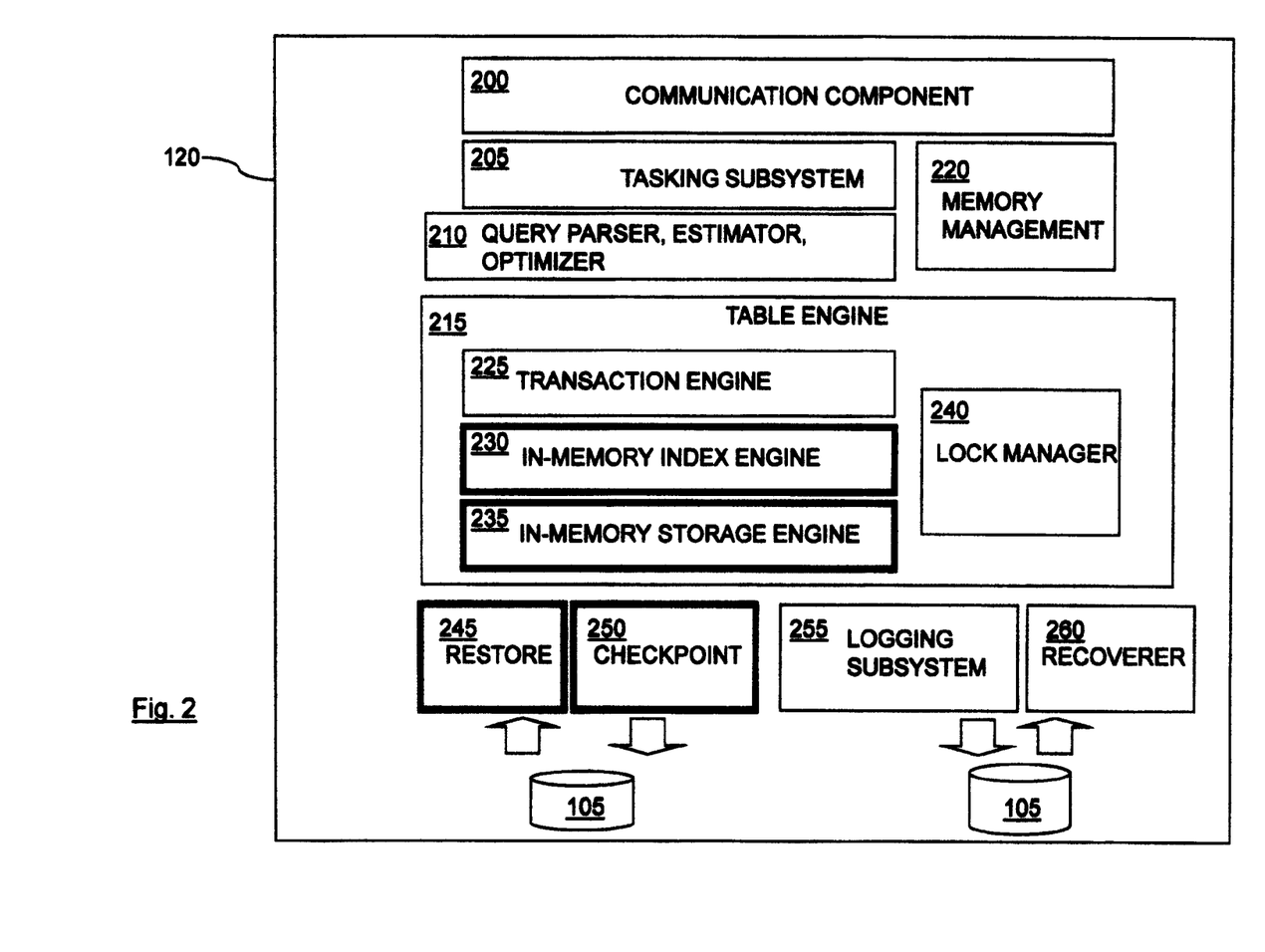

FIG. 1 shows a database system 100 in which an in-memory database management system 120 is run by the database system 100. The in-memory database management system 120 allows one or more users to access a database concurrently. A user can be an end user who interacts with the database management system 120 from a client side workstation 115 through an online application 110 or from an interface provided by the in-memory database management system 120. The database management system 120 comprises a number of hardware and software components which interact with each other in order to query, retrieve, and store user requests. The hardware components are depicted in FIG. 1 and the software components are depicted in FIG. 2. Clients of the system 100 can be located either in the same computer with the database server process or on a different computer. A "client" of the system can be either a specific device or a process that make requests to the database.

The hardware components form the computing platform in which the database management system 120 resides and operates, for example a server which is accessible across a network. These hardware components comprise main memory 135, secondary storage volumes 105, I/O devices, device controllers, I/O channels and CPUs 125, etc. The main memory 135 is in the form of random access memory (RAM) and is used as a primary storage unit where all data is stored "in-memory". Database files are contained within a database file unit and transaction logs provide a persistent backup of the data in the database. In this document, the term RAM means the main memory 135 and is the primary storage unit. Secondary storage is provided by secondary storage volumes 105 such as disk storage. However, it will be obvious to a person skilled in the art that disk storage is not the only technological means in which to implement persistent storage.

The secondary storage volumes 105, which may be magnetic disk storage, are used to backup data and to store checkpoint information and logging information. Data may be backed up onto one or a plurality of secondary storage volumes 105. The secondary storage volumes 105 may be directly connectable to the database management system 120 or connectable and accessed across a network. Therefore in an in-memory database management system 120, the data resides in RAM 135 and the data is backed up to a secondary storage volume 105.

Referring to FIG. 2, a communication component 200 of the database management system 120 receives requests from users for data stored in one or more of the databases. A request received from a user is in the form of a query in a query language specified by the database management application, for example, a structured query language, such as SQL. The communication component 200 also receives the results of the query for transmitting back to the requesting user 115. A query parser, estimator, and optimiser component 210 receives a query from the communication component 200, transforms the query into a set of actions, and determines the optimal strategy for executing the query. A query can comprise both read and update operations or only a single type of operation.

A tasking subsystem 205 provides a means to receive tasks requested by users 115 (the client devices or processes) and, if necessary, to split the received tasks into sub-tasks and assign the sub-tasks to server threads. This allows the database system to serve all user requests. Alternatively, a client/thread model is deployed in which each client request is served by a single thread. Thus each client task is executed continuously from the beginning to the end of the assigned task.

A memory management component 220 receives memory allocations and memory release requests from an in-memory engine (not shown). There is typically a plurality of memory managers 220 assigned to different types of requests in order to satisfy a large number of simultaneous requests. A table engine 215 comprises a transaction engine 225, an in-memory index engine 230, an in-memory storage engine 235, and a lock manager 240. The purpose of the table engine 215 is to manage all of the database tables and indexes of the database management system 120. The transaction engine 225 receives inputs from the query parser component 210 and creates transactions from the input. For example, the input may comprise a query written in SQL, for example (INSERT INTO TAB1 VALUES (1, 'John');)

The transaction engine 225 decomposes the statements to ensure that there is no row with identifier '1' already in the database, and inserts the key '1' into the index and the row into storage.

A logging subsystem component 255 records all of the modifications to the data stored in RAM 135 and writes the modifications to the secondary storage 105. Logs are used to ensure that a consistent database can be recovered even if the database image is not available. The lock manager 240 provides a shared and exclusive lock for client threads that need to perform protected operations to the data stored in the database. A requesting client thread must acquire a lock to a row and the row is exclusively locked for the client thread for the duration of operation before its execution is permitted. Such a client thread acquires a lock name by using a primary key of the row, for example. Then the client requests the lock from the lock manager 240 for the lock name. The modified in-memory index engine 230 provides one or more indexes for each database table which is held in memory 135.

Figure 3:
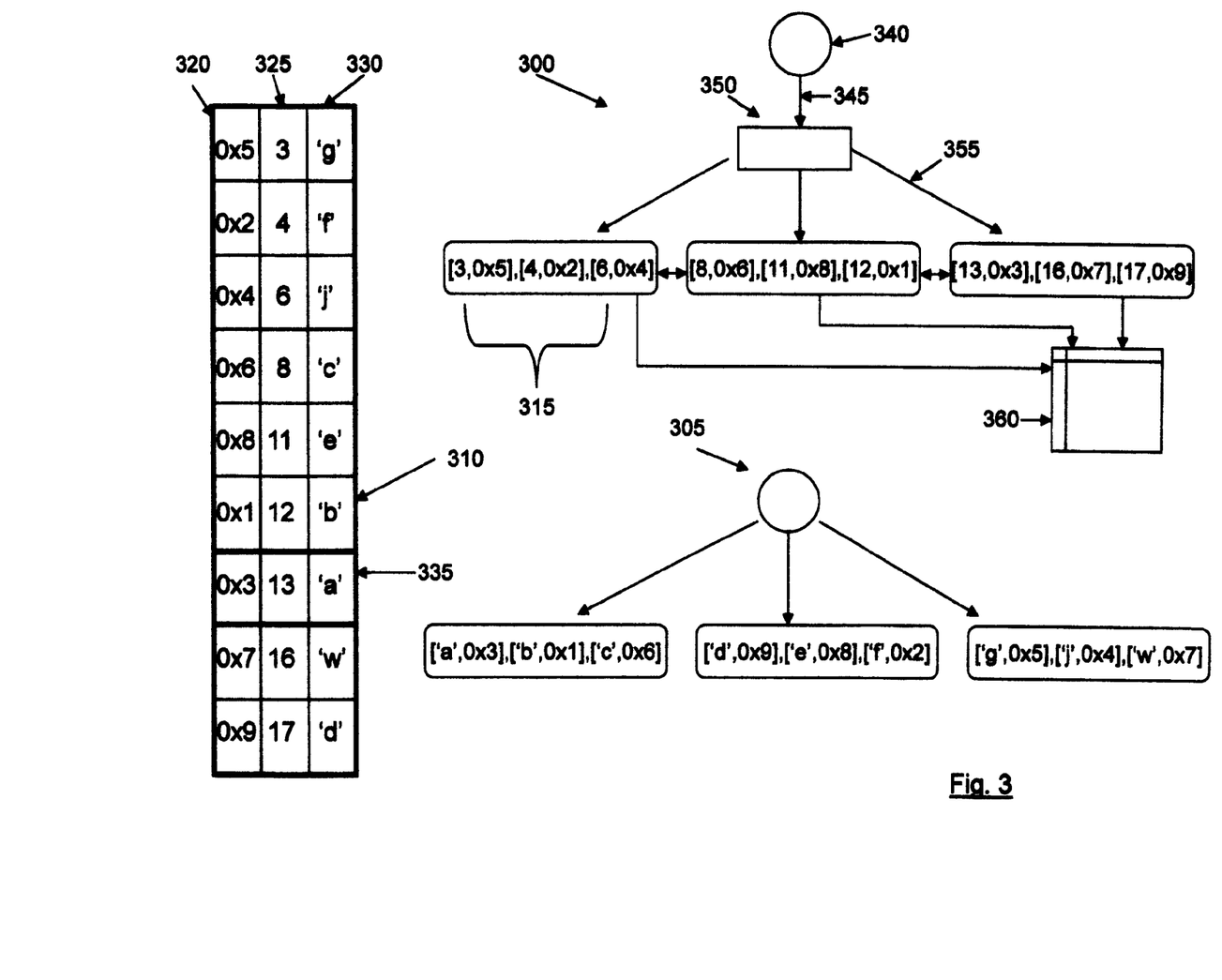
FIG. 3 is a schematic diagram of a database table and a primary and secondary index derived from the database table.

FIG. 3 illustrates two types of indexes, namely a primary index 300 and a secondary index 305, and illustrates how these indexes are derived from a database table 310. A simplified database table 310 is shown, having columns that comprise a memory address 320 (shown in the figures using the notation OX followed by a value) of the row and two attributes 325, 330. The first attribute 325 is a numeric value, and is also the primary key attribute. A second attribute 330 is of character type, and is indexed by the secondary index. For example, the data attribute 'g' in the first row of column 330 has a primary key attribute of the value '3' and has a memory address of '5' (and accordingly, a hexadecimal value of the memory address is in the figure as 0x5) and the data attribute T in the third row of column 330 has a primary key attribute of the value '6' and has a memory address of '4'. Typically, every database table 310 has a user-specified primary key attribute 325, which can consist of one or multiple attributes. The primary key attribute 325 must be unique among the rows in the table 310. If there is no user-defined primary key attribute 325, the database management system generates an identifier for each row in the table.

The primary index 300 comprises a number of values, namely the primary key attribute 325 and a memory address 320 that specifies where the database row 335 is located in memory 135. Each of these values is held in a leaf node 315, and a plurality of leaf nodes 315 form a leaf node page 360 of a specified page size. The secondary index 305 comprises the secondary key attribute 330 and its associated pointer to the memory address 320. During a checkpoint operation, row addresses and offsets to their corresponding disk page number in the disk array are stored in a row address translation table 400 (as discussed below with reference to FIG. 4).

Each row 335 in a database table 310 comprises two attributes, namely a name 330 and a primary key identifier 325. For example, the name 330 may be a customer name and the attribute 325 may be a customer identifier, in which case the primary key identifier 325 is used as an identifier for each customer listed in the table (i.e., for each row 335 of data). When a new customer is inserted into the database table 310, the new row must at least have a primary key attribute 325. The row is stored in tuple storage and the primary key attribute is stored/inserted into the primary index 300 and then the name of the customer is inserted into the secondary index 305. Both the primary and the secondary indexes are transient, except their leaf nodes 315 which are stored in a checkpoint image.

Indexes are typically tree-like data structures or hash function based indexes (hash indexes). A typical tree like structure is a "B+-tree". Each tree-like data structure comprises a root node, branch nodes, and leaf nodes. The root node 340 may be either a leaf node 315 or a node having two or more children. Internal nodes (i.e., not leaf nodes) may comprise between v and 2v keys, and a node with k keys has k+1 children. Leaves are always on the same level of a branch. Nodes that do not have any child nodes are described as leaf nodes, i.e., terminal nodes. An internal node is any node of the tree that comprises pointers to one or more child nodes. Leaf nodes comprise one or more key values, and are pointed to by pointers 355. Pointers 355 and 345 are internal pointers of the primary index. Every memory address (shown in the figure as 0x followed by a value) in each of the leaf nodes is a row/tuple pointer referring to a memory address where the row is located.

A root node 340 comprises node pointers 345 to branch nodes 350 A branch node 350 comprises pointers 355 to leaf nodes 315 or to other branch nodes. A leaf node 315 comprises index keys, pointers to database rows, and horizontal pointers to other leaf nodes. A leaf node page 360 is a page including one or more leaf nodes 315. This is because leaf nodes 315 in in-memory database management systems are typically smaller than disk pages. For example, some types of in-memory database have a node size of 512 bytes and a default page size of 16 kilobytes. Storage pages are collections of database rows called "tuples". Tuples are ordered by the primary key, grouped to logical storage pages, and pointed to by index entries using direct pointers. During a database checkpoint, the storage pages including one or more modified tuples are copied to a page size memory buffer called a checkpoint buffer for disk write operations.

When a checkpoint operation is performed, a checkpoint component 250 (FIG. 2) communicates with the in-memory index engine 230, the in-memory storage engine 235, and the table engine 215 to generate and write a checkpoint image of a database to a secondary storage medium 105. A checkpoint is created when a database is open and active. The checkpoint component 250 performs a process whereby altered storage pages are written from one storage unit, such as RAM 135, to another storage unit, such as disk 105. The end result of a checkpoint is a snapshot of a database being stored on the disk 105.

The in-memory index engine 230 associates a global checkpoint counter with each database or database instance stored on the server, and the global checkpoint counter is incremented by the value of one each time a new checkpoint operation commences. A copy of the global checkpoint counter is also associated with each leaf node page 360. If the copy of the global checkpoint counter associated with each leaf node page 340 equals that of the global checkpoint counter, then the index has already been checkpointed, i.e., its altered leaf node pages 360 are already copied to the checkpoint buffer for disk write. However, if the copy of the global checkpoint counter associated with a leaf node page 340 comprises a value which is smaller than that of the value of the global checkpoint counter, then the leaf node page 360 has not been checkpointed.

The in-memory index engine 230 is responsible for providing a global access controlling mechanism, for example a global gate. Entering the global gate ensures that there are no further updates to any of the database tables. Each time a database is checkpointed, the checkpointing operation enters the global gate in an exclusive mode, thus preventing any updates to the tables. This process is called a checkpoint freeze.

The checkpoint component 250, during a checkpoint freeze operation, prevents updates to any of the indexes and pages. The checkpoint component 250 in conjunction with the in-memory storage engine 235 writes "dirty" pages 360 (i.e., pages that have been updated but not incorporated into any checkpoint image) for storage to a checkpoint buffer, and internal index pointers 355, 345 and offsets pointing to their corresponding relative disk page locations are collected and written to a row address translation table.

An internal index pointer 355, 345 is a direct memory reference to a row (tuple) pointer stored in either an internal node or a leaf index node. An offset is a location relative to the beginning of a location in a disk address array. If, for example, there is an address '0x12345' having an offset value of 2 in a row address table, this means that the row in memory position '0x12345' has a copy in the checkpoint image and the actual disk address of the copy is the third from the beginning of the disk address array. A "two" offset means two steps forwards from the beginning. Row pointers are hexadecimal addresses in leaf nodes.

Figure 4:
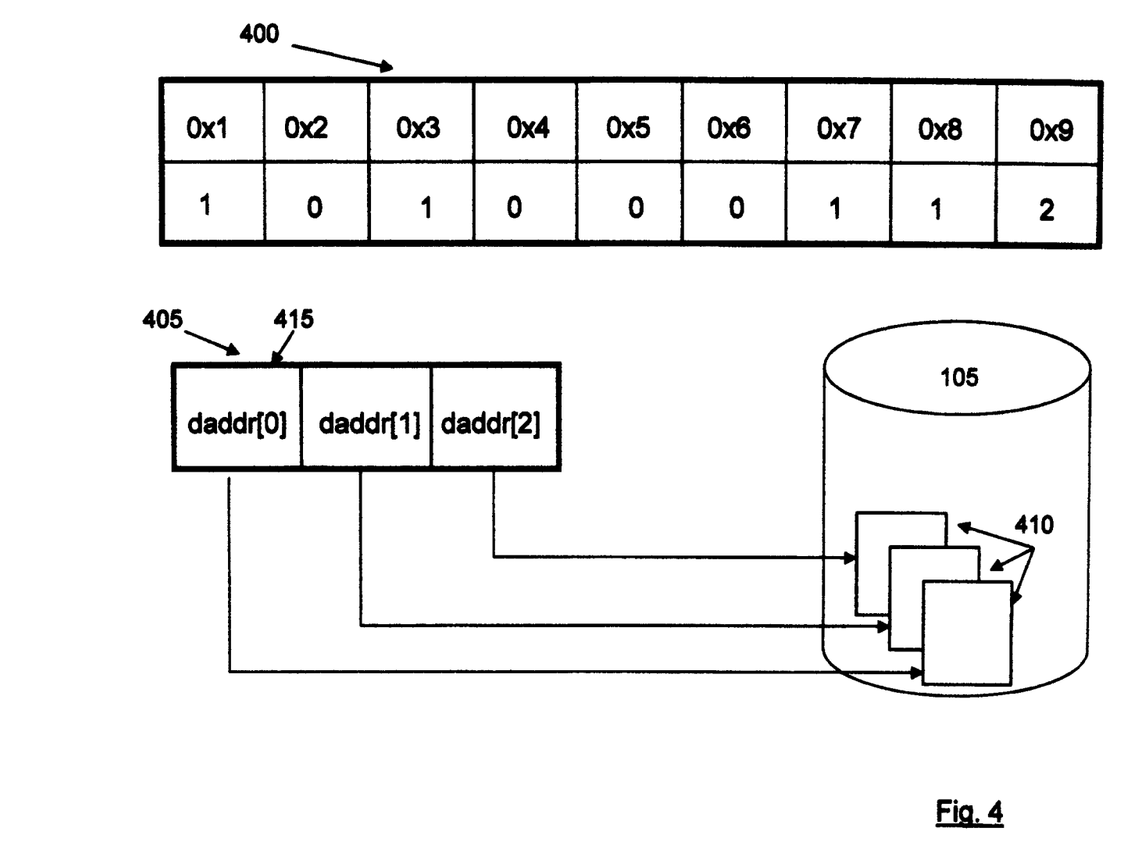
FIG. 4 is a schematic diagram of a row address translation table and disk address array.

FIG. 4 shows an example of a row address translation table 400 which translates the row addresses (i.e., addresses in RAM) to secondary storage disk addresses after checkpointing. The row address translation table 400 is stored and managed by the in-memory index engine 230. Disk page addresses 415 are stored in an ordered array, which is a continuous memory area where 4-byte disk addresses are stored next to each other, and this is where offsets in the row address translation table 400 point. The array 405 of disk page addresses 415 is also incorporated into the checkpoint image 410. Leaf node pages' relation identifiers (discussed below) and disk addresses are stored in a relation identifier directory. Database rows are written to the checkpoint image 410 as pages equal in size to the disk block. Every page has rows from the same table.

A relation identifier is a value that identifies one database table from another. The table engine 215 generates the relation identifier for each table at the time a new table is created. When leaf node pages (of indexes) are written to a checkpoint image, the relation identifier and the target address of the newly created table are stored into a relation identifier directory. The relation identifier directory is incorporated into the checkpoint image, and this directory is used when the database is being restored to find leaf nodes pages of indexes of tables. When all necessary pages are copied to disk, the relation identifier directory itself is copied to disk, thus becoming part of the checkpoint image 410.

Also for incorporation into the checkpoint image 410 is the row address translation table 400 which comprises direct row pointers and their offsets which point to their corresponding relative disk page locations. The row address translation table 400 is created when leaf nodes 315 are copied for checkpointing. Each row address that is stored in a leaf node 315 is copied to row address translation table 400 and the disk page address is copied to the disk address array 405. The offset of the disk page address 415 in the disk address array 405 is copied with the row addresses. The forthcoming target address on the disk is known already when the row addresses are copied from leaf nodes so that disk page addresses can be copied first to the disk address array 405 and the disk address offset can be inserted into the row address translation table 400 with each row address. Thus the generated checkpoint image 410 comprises database table rows 335, leaf nodes 315 associated with the indexes 300 and 305 of the database table rows, the row address translation table 400, the disk address array 405, and the relation identifier directory.

FIG. 4 shows the row address translation table 400 and a disk address array 405. The values specified in the first row of the row address translation table 400 refer to positions in memory and the values specified in the second row refer to positions in the disk address array 405. For example, value 0x9=2 in the row address translation table 400 means that the same row that is located in memory address 0x9 is copied to the disk address stored in the third position in the disk address array (daddr[2]) 405. During a checkpoint operation, tuple addresses (row addresses) and offsets to their corresponding disk page addresses 415 in disk address array 405 are stored in the row address translation table 400. Once the checkpoint image 410 has been created, a restore component 245 will use the latest version of checkpoint image 410 in the event of a database failure.

The database system discussed above is able to perform a checkpoint operation and restart from the checkpoint image much faster than conventional database systems that use conventional checkpoint processes. The core of the improved system is how the leaf nodes 315 of primary index 300 and secondary index 305 are organized in the main memory 135. The main principal is that the leaf nodes 315 are arranged close to other leaf nodes 315 that have similar key values in the physical memory pages (where a page is a contiguous memory area equal in size with a disk page size). Organizing the leaf nodes 315 in this way makes it possible to find a key from a large amount of pages (including leaf nodes) while examining only a small fraction of them, even if they are copied from memory to disk, or to another persistent memory (such as a non-volatile memory) or to another computer.

During run time, when new leaf nodes 315 are created and deleted, a memory allocator within the management system 120 uses a special-purpose data structure, called an allocator index, to assist in managing memory pools and to make it possible to quickly find the right location in memory for a new leaf node 315. The allocator index makes it possible to physically cluster index leaf nodes 315 by the prefixes of their low keys (i.e., the smallest key in a leaf node 315). As a result, leaf nodes 315 that have similar prefixes in their low keys are located in the same memory pages.

Figure 5:
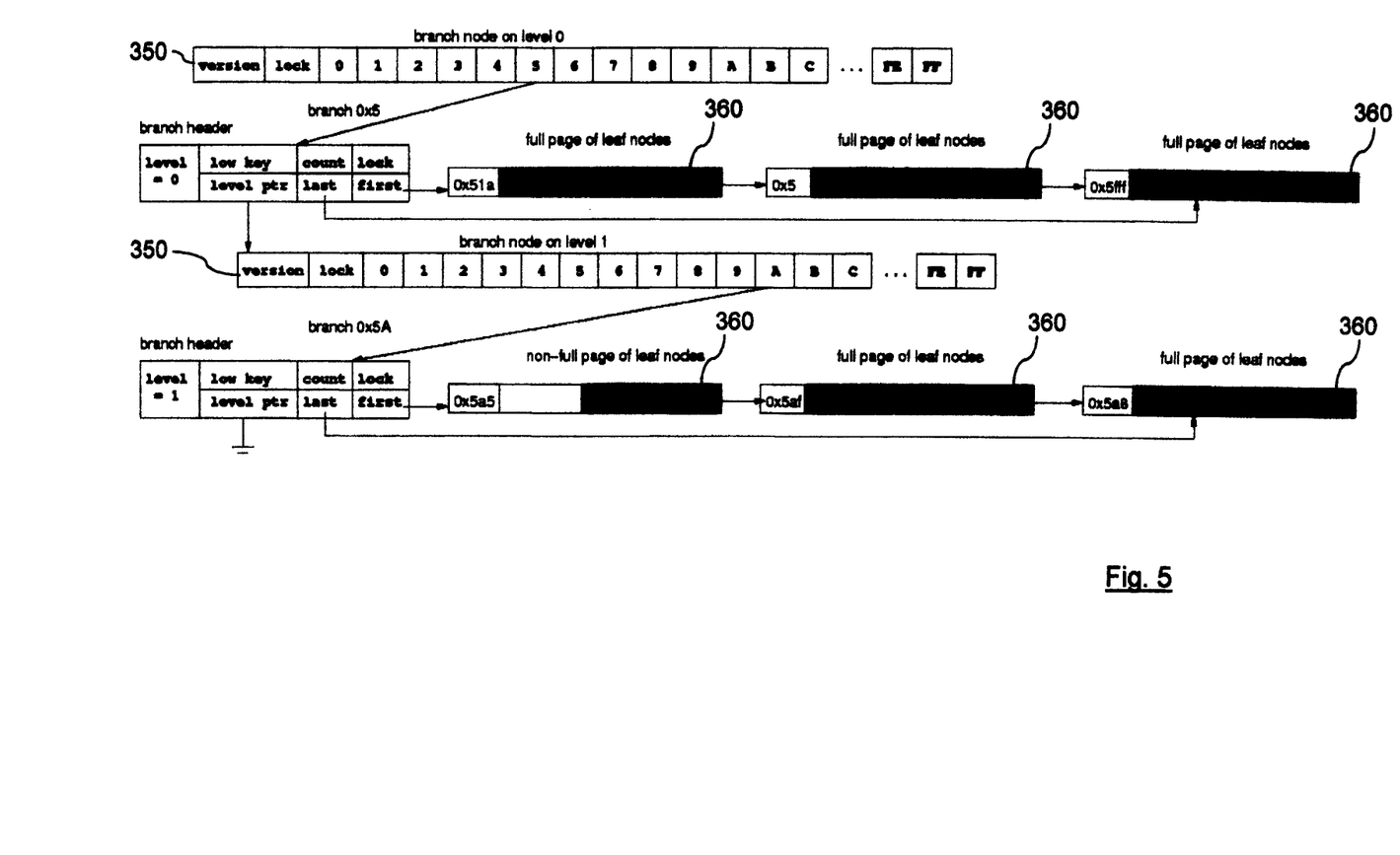
FIG. 5 is a schematic diagram of an allocator index and leaf node pages.

FIG. 5 illustrates an example of this process. In the allocator index, on the first level there are three leaf node pages 360 filled with leaf nodes whose low key prefixes are 0x5 (shortened hex value, 0x50000000 in its complete form). In this case, the allocator limits each level to include a maximum of three pages, and if and when that limit is exceeded, future allocations will be done on the next level. On the second level, every node's low key's two most significant bytes must match with branching bytes, for example, with 0x5A. In this example, the first level (shown in the figure as level=0) is full and the memory allocation for the new leaf node 315 will therefore be located on the second level (shown in the figure as level=1) in branch 0x5A. As a consequence, there are two full pages 360 and one half full page 360 on the second level.

The allocator index, which includes the branch nodes 350, is transient, so it will not be copied to a checkpoint image during the checkpoint process and will not exist at the time of any future database restart (e.g., a restore operation). Branch is a set of main memory pages for nodes, whose low keys' prefix equals with the branch prefix. The allocator index is a variant of a trie (also known as a digital tree). Common trie compression techniques, such as width compression, or different node types (as alternatives to 255-value branch nodes) can be applied to shrink the size of the allocator index. Trie compression, however, is not essential.

The keys within any leaf node 315 form an ascending sequence of values. Leaf nodes 315 are linked with each other so that the next leaf node 315 includes bigger keys, and previous leaf node 315 includes smaller keys. When a new leaf node 315 is created, there is performed a memory allocation analysis, using the allocator index, based upon the lowest key value of the new leaf node 315 to identify a non-full memory page 360 storing a leaf node whose lowest key value is similar to the lowest key value of the new leaf node 315, and the new leaf node is stored in the identified non-full memory page 360. If no such page 360 is identified, then a new page 360 will be created in the correct place within the index.

As a part of every checkpoint process, the leaf node pages 360 are included in checkpoint image 410. The allocator index, however, is not part of the checkpoint process. However, the address of each memory pool branch is included in the checkpoint image, and thus the checkpoint image 410 includes information about where the index leaf nodes with certain kind of keys are located. The similarity between leaf node keys is based on byte comparisons starting from most significant bytes, that is, leftmost bytes of the key's byte value. For example, keys '0xa9f' and '0xac1234' would be stored in the same branch in the memory pool and they would end up on same disk block or disk blocks that are near to each other in the checkpoint image 410.

Figure 6:
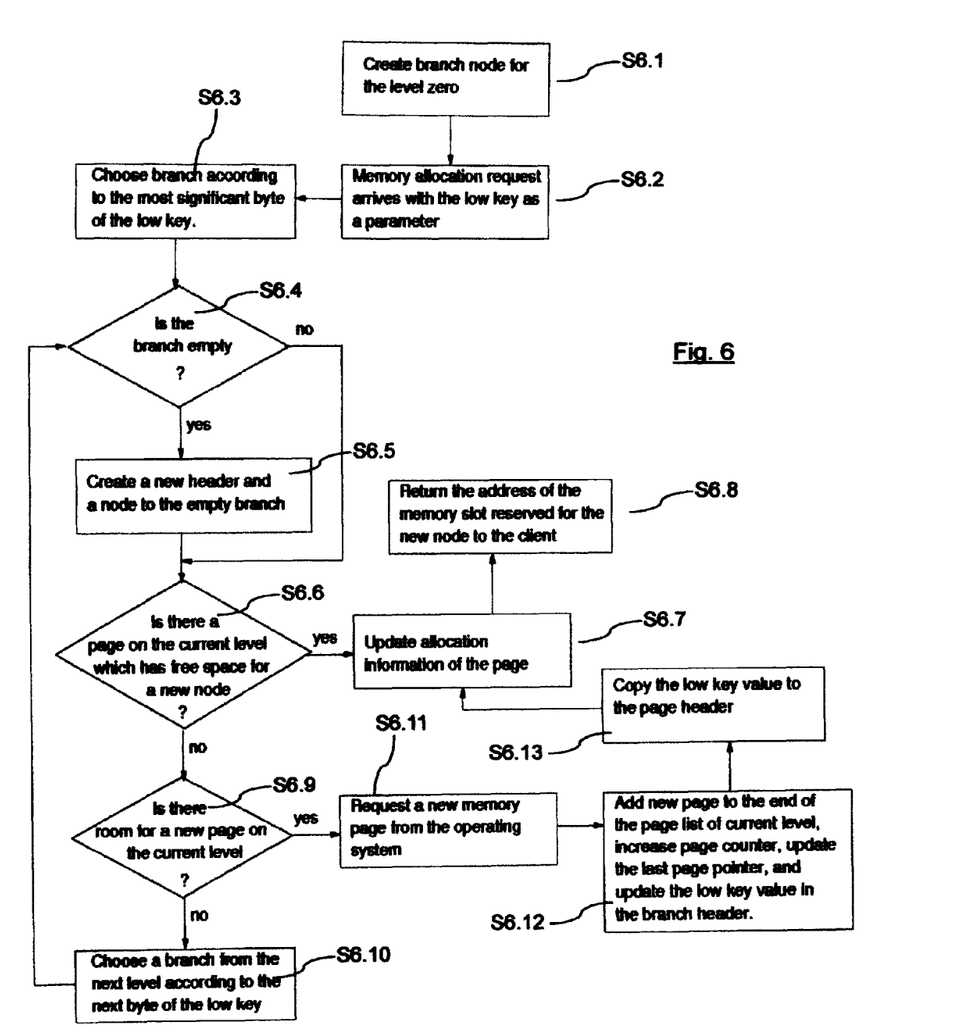
FIG. 6 is a flowchart of a method of allocating memory to a new leaf node.

FIG. 6 shows a flowchart of the memory allocation process that takes place following the creation of a new leaf node 315. The first step S6.1 comprises the creation of a branch node 350 at level 0. At step S6.2, a memory allocation request is received which has the lowest key of the new leaf node 315 as the allocation parameter. (Leaf nodes 315 usually contain multiple key values, so the lowest is used as there is more than one key value present.) At step S6.3, the appropriate branch within the branch node 350 is chosen according to the most significant byte of the low key. In the example of FIG. 5, the most significant byte of the low key would be "5".

At step S6.4, a check is made to see if the branch is empty. If it is empty, then at step S6.5 there is created a new branch header and a node to the empty branch. If the branch is not empty, then the process moves directly to step S6.6. In the example of FIG. 5, the branch "5" is not empty; there already exists a header and node pages 360. At step S6.6, a check is made to see if there is a leaf node page 360 on the current level which has space to store the new leaf node 315. If yes, then at step S6.7 the allocation information of the page is updated and at step S6.8, there is returned the address of the memory slot reserved for the new leaf node 315.

In the example of FIG. 5, the check of step S6.6 would return the answer "no", as there is no page 360 with room for a new leaf node 315 at the branch level 0x5. The process would therefore move to the check at step S6.9, which checks to see if there is room at the current level for a new page 360. If the answer is no, as would be the case in the example of FIG. 5 (since the allocator index is limited to 3 pages at each level), then the process would move to step S6.10 which is the selection of a branch at the next lower level according to the next most significant byte of the low key of the new leaf node 315. In the FIG. 5 example, this would be the "A" of the key "0x5A . . . ". The process then returns to the step S6.4 and cycles through the appropriate steps.

If the check made at step S6.9 returns a "yes", meaning that there is room at the current level for a new page 360, then the process moves to step S6.11, which is the request for a new memory page from the operating system. The process then proceeds to step S6.12, which comprises adding a new page to the current level and performing the appropriate administration. As shown in the figure, the administration preferably comprises increasing the page counter, updating the last page pointer, and updating the low key value in the branch header. The process then moves to step S6.13, where the low key value from the new leaf node 315 is copied to the new page header, and the process moves to step S6.7 and completes steps S6.7 and S6.8 as discussed above.

The modified memory allocation process makes it possible for an in-memory database to access all data, and execute transactions long before the database has been fully loaded in memory. The process provides means to load the database, access all the data, and execute client transactions all at the same time thus providing service hours before such a traditional in-memory database server which needs to load the full database into memory before it can execute client transactions.

For example, assuming a terabyte database with one table, where the key size is 8 bytes, the row size is 512 B, the page size is 64 kB (65536 B), the data can be read from disk at the speed of 100 MB/s, the number of keys with 1.5 overhead factor is 3.2 billion, and the number of pages with 1.3 overhead factor is 1.1 million. If all data must be loaded into memory before opening the server for clients, the bytes to read in total is 67.4 GB (65536*1.1*10^6), and reading that from very fast secondary storage lasts 687.5 seconds, that is, about 11 minutes. In other words, it takes at least eleven minutes before the first transaction can be executed in the database server. It is not unusual to have 10 to 20 times bigger databases than this. With such larger databases, the start-up time for a database server will be several hours.

In addition to the assumptions above, with the node allocation strategy and leaf node index, it can be assumed that every pool has at most 10,000 pages on each level (noting that in the example of FIG. 5, a value of three is used), and the searched-for key value is found from the right-most page at the bottom-most level (which is the worst case scenario). With the proposed leaf node allocation scheme combined with leaf node checkpointing, by using the leaf page index, the searched data page can be found by reading 70,255 pages. Data to be read is then approximately 4.4 GB, and reading this data to memory lasts approximately 44 seconds. At this moment, the first transaction has found an index leaf node page that includes or doesn't include, depending on the existence of the searched-for value, the location of the row that is identified by the search key. At that time, the database performance is roughly on the performance level of a common disk-based database engine.

Operations that search for keys in leaf nodes that have not been read yet to memory are served slower than in a common disk-based database engine but faster than the worst case. Operations that search for keys in leaf nodes that have already been accessed are served faster than in a common disk-based database engine. Other transactions are served at the speed of an in-memory database.

In relation to the allocator index, the number of pages that there can be in a branch is limited. When there are a maximum number of full pages in a branch, and a new page is needed, a new level must be created. Instead of allocating a new page in addition to previous pages, a new array of pointers is created. The array includes 255 (initially NULL) pointers to branches on the next level. If the level that became full was the first, then the nodes' smallest keys' first byte determined that the nodes belonged to that branch. The branch for the new node on the second level is chosen by the second byte value of the node's low key.

The maximum height of the allocator index (where maximum height=number of levels) with 8-byte keys is as follows. Pages on a previous level are not relocated although a new level would be created, but as long as the first level remains full, all new nodes go to the second level. When the second level becomes full, the third level is created, and so on. With 8-byte keys, there can be at most h different levels, as shown by the following.

Let k=keys on each level.
Let h=height, i.e., number of levels.
Let n=number of bytes in key.
Let x=number of memory pages per level.
h=n−x, where $2^8x <= k(8-x)$
In a first example, if k=10,000, then $2^8x+10,000x <= 80,000$
x=1, then 256+10,000<=80,000, thus h=7.
In a second example, if k=100,000, then $2^8x+100,000x <= 800,000$
if x=2, then 265,536<=800,000<=> true, thus h=6.

Figure 7:
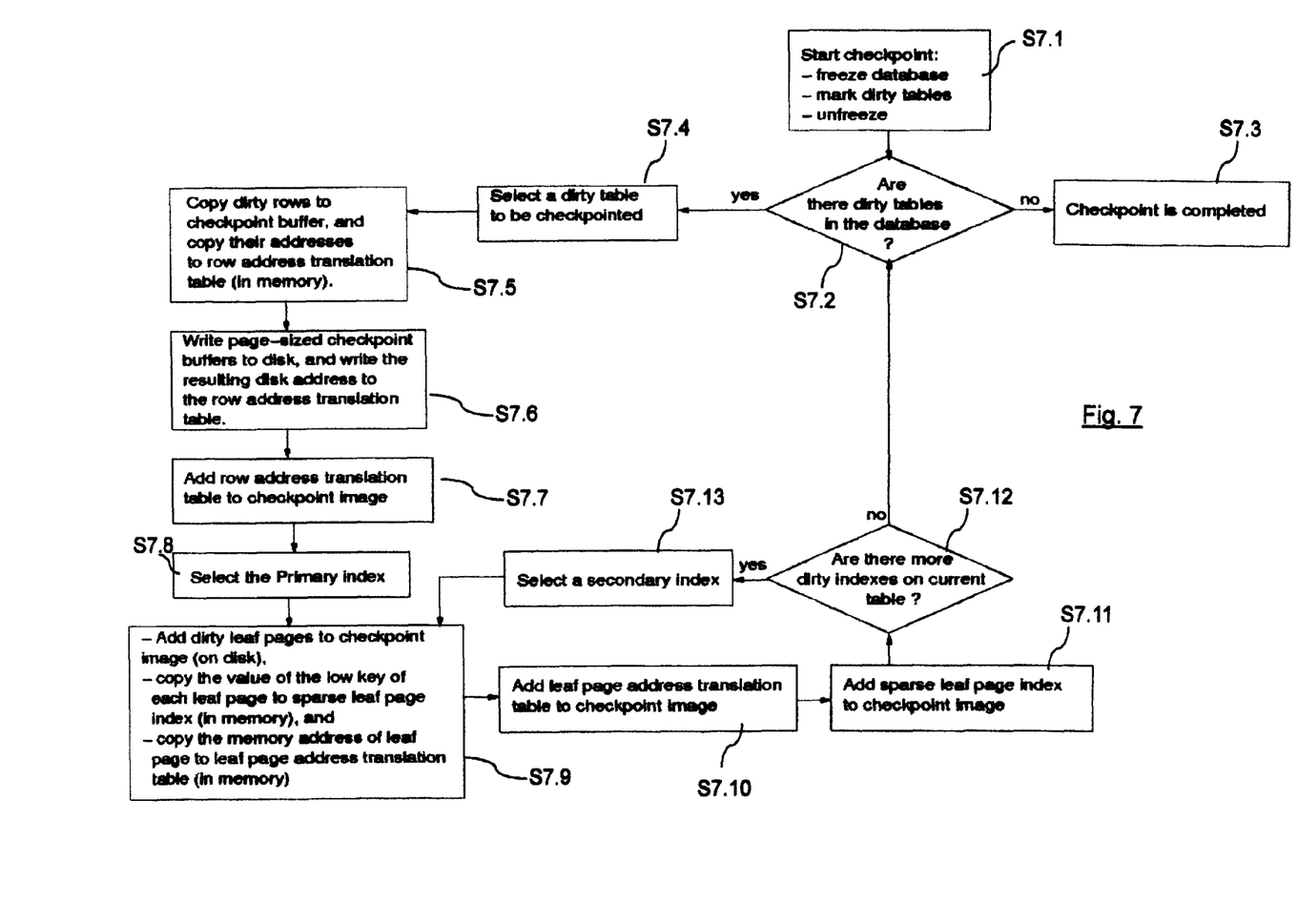
FIG. 7 is a flowchart of a method of performing a checkpoint operation.

The checkpoint operation is summarised in the flowchart of FIG. 7. The checkpoint operation creates a copy of all of the database tables 310 being stored by the main memory 135 and creates a checkpoint image 410 for storage in a secondary storage device 105. Leaf node pages 360 also form part of the checkpoint image 410, as will be described below. The first step of the process is step S7.1, which comprises freezing the database, marking the "dirty" tables 310, and then unfreezing the database. A "dirty" table 310 is one that has changed since the last checkpoint operation was carried out.

At step S7.2, a check is made to see if there are still dirty tables 310 within the database. If there are not, then the process moves to step S7.3, where the process is terminated, as the checkpoint is complete. However, if there are dirty tables 310 within the database, then the process moves to step S7.4, where a dirty table 310 is selected to be checkpointed. At step S7.5, dirty rows 335 are copied to a checkpoint buffer and their addresses are copied to the row address translation table 400 (as described above in detail with reference to FIG. 4). At step S7.6, page-sized checkpoint buffers are written to disk 105 and the resulting disk addresses are written to the row address translation table 400. The next step is the step S7.7, which comprises adding the row address translation table 400 to the checkpoint image 410.

This is followed by the processing of the primary index 300, which is selected at step S7.8. At step S7.9, the contents of the primary index 300 are processed. This involves adding any and all dirty leaf node pages 360 to the checkpoint image 410 and copying the value of the low key of each dirty leaf page 360 to a sparse leaf page index (which is currently in memory 135), and copying the memory address of the dirty leaf node pages 360 to a leaf page address translation table (also currently in memory 135). At step S7.10, the leaf page address translation table is added to the checkpoint image 410, and at step S7.11, the sparse leaf page index is also added to the checkpoint image 410.

At step S7.12, a check is made to see if there are any further dirty indexes for the current table 310 and if there are, then the process moves to step S7.13 and selects the next secondary index 305. If not, then the process moves to step S7.2 and continues to cycle until all of the dirty tables 310 have been checkpointed.

Once a checkpoint operation has been performed, the checkpoint image 410 is available for a restore operation. If a restore is required using the checkpoint image, then the method of the memory allocation (FIG. 6) and the method of the checkpoint process (FIG. 7) mean that it is possible for a client to access usable data very quickly from the checkpoint image 410, without having to first load and organise the entire checkpoint image 410. The operation of the restore process is summarised in FIG. 8.

Figure 8:
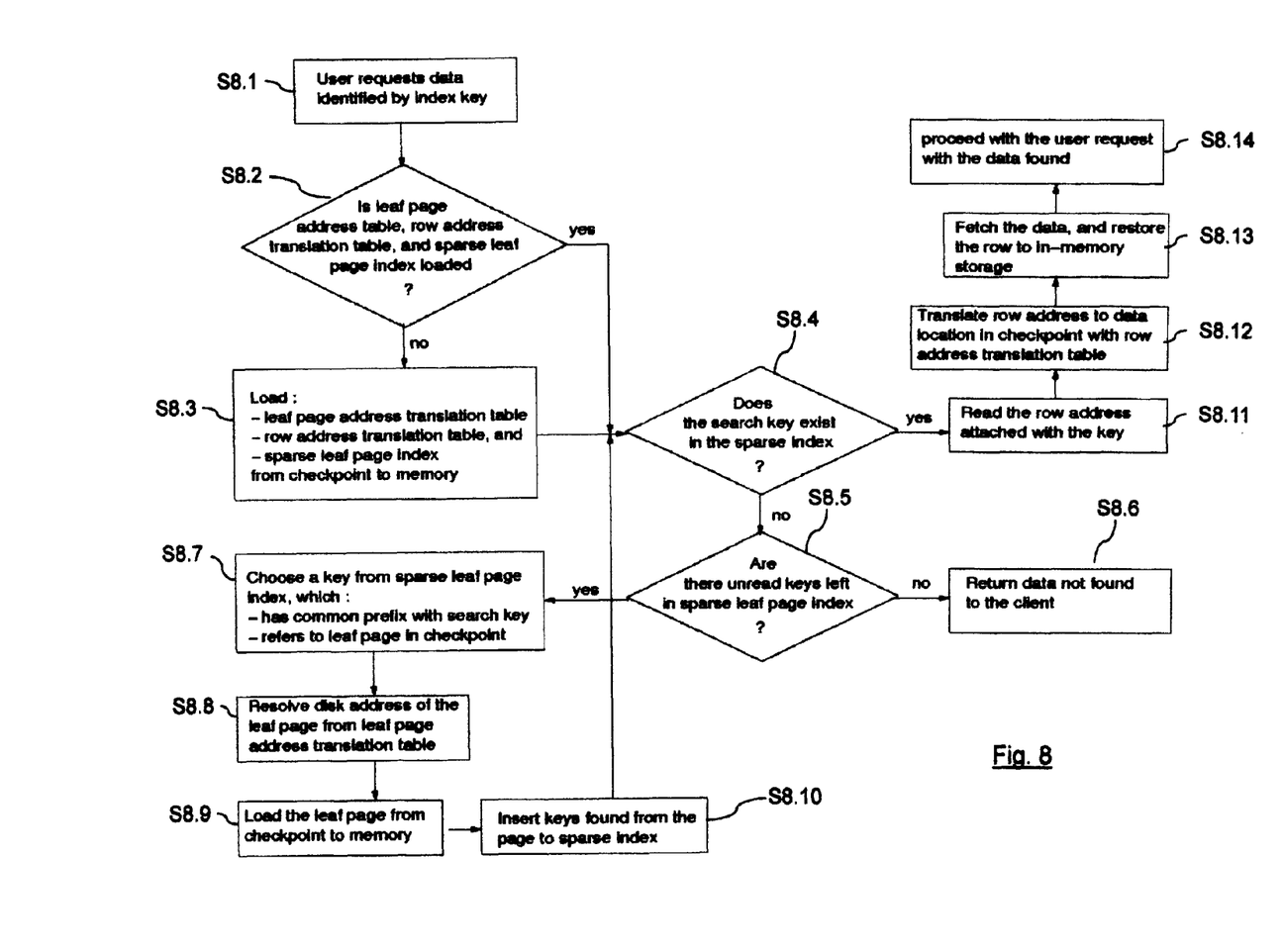
FIG. 8 is a flowchart of a method of performing a restore operation.

At step S8.1, a user requests data identified by an index key. At step S8.2, a check is made to see if the leaf page address translation table, the row address translation table, and the sparse leaf page index have been loaded and if not, then at step S8.3 these are loaded. At step S8.4, a check is made to see if the key being searched for is present in the sparse leaf page index and if not, a further check is made at step S8.5 to see if there are any unread keys left in the sparse leaf page index. If not, then the method terminates at step S8.6, which returns a "data not found" message to the requesting client.

If there are unread keys left in the sparse leaf page index, then the process moves to step S8.7 where a key is chosen from the sparse leaf page index which has a common prefix with the key being searched and which refers to a leaf node page 360 in the checkpoint image 410. At step 8.8, the disk address of the relevant leaf node page 360 is resolved from the leaf page address translation table At step S8.9, the leaf node page 360 is loaded from the resolved disk address within the checkpoint image 410 on the secondary storage 105 to the main memory 135. At step S8.10, the keys found on the loaded page 360 are inserted into the sparse index. The process returns to the check step S8.4.

If the check step S8.4 returns a yes, then the process continues to step S8.11 where the row address attached with the key is read and at step 8.12, the row address to the data location in the checkpoint image 410 is translated using the row address translation table 400, thereby obtaining the offset into the disk page. At step S8.13, the relevant data is fetched using the value obtained from the translation table and the row of data is restored to the in-memory storage 135. At step S8.14, the user request for the data can be fulfilled.

The improved database system can take the form of an entirely hardware embodiment, an entirely software embodiment, or an embodiment containing both hardware and software elements. In a preferred embodiment, the database system is implemented in software, which includes but is not limited to firmware, resident software, microcode, etc. The database system can take the form of a computer program product accessible from a computer-usable or computer-readable medium providing program code for use by or in connection with a computer or any instruction execution system. For the purposes of this document, a computer usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disk read only memory (CD-ROM), compact disk read/write (CD-R/W), and DVD.

The invention claimed is:

1. A method of operating a database system, comprising:
storing a database table in a memory, the database table comprising a plurality of rows, each of the rows comprising a key value and one or more attributes, the key value for each row being uniquely associated with the row;
storing, in the memory, a primary index for the database table, the primary index comprising a plurality of leaf nodes, a root node, and at least one intermediate branching node connecting the leaf nodes with the root node, each of the leaf nodes storing one or more of the key values and, for each stored key value, a respective memory address defining a storage location where the row that is uniquely associated with the respective key value is stored in the memory, wherein the storing of each of the leaf nodes in the memory comprises:
storing the leaf node in a particular one of a plurality of memory pages of the memory, each of the memory pages having a size that corresponds to a secondary storage page size of storage pages used when performing a checkpoint of the database table to a checkpoint image stored on a secondary storage, the particular one determined using a prefix of a lowest of the one or more key values stored in the leaf node to provide a physical clustering that stores leaf nodes having similar prefixes in physically-near ones of the memory pages to thereby enable the leaf nodes to be usable for quickly retrieving rows of the database table from the checkpoint image upon a restore of the database table from the checkpoint image; and
performing the checkpoint of the database table, comprising:
checkpointing the rows by copying the rows to first ones of the storage pages of the secondary storage;
checkpointing the primary index by copying the memory pages storing the leaf nodes of the primary index to second ones of the storage pages of the secondary storage, while the root node and the intermediate branching nodes are not copied to any of the storage pages of the secondary storage; and
writing, to third ones of the storage pages of the secondary storage, a leaf node page index that allows the first ones of the storage pages to be retrieved out of order upon a restore of the database table from the checkpoint image to the memory such that a particular one of the rows can be quickly retrieved from the first ones of the storage pages and restored to the memory, wherein the leaf node page index stores, in a page header for each of the second ones of the storage pages, a lowest of the key values stored in any of the leaf nodes stored therein.

2. The method according to claim 1, wherein:
checkpointing the rows copies only the rows that are dirty; and
checkpointing the primary index copies only the memory pages storing leaf nodes that are dirty.

3. The method according to claim 1, wherein determining the particular one of the memory pages in which to store the new leaf node comprises:
accessing an allocator index usable for memory allocation analysis of the memory pages;

choosing, as a current level, a branch of the allocator index according to a most-significant byte of the lowest of the one or more key values stored in the new leaf node; and iteratively repeating, until selecting the determined memory page:

determining whether a non-full one of the memory pages exists for the current level, and if so, selecting the non-full one as the determined memory page;

responsive to determining that the non-full one of the memory pages does not exist for the current level, determining whether an additional memory page can be created for the current level, and if so, creating the additional memory page and selecting the created memory page as the determined memory page; and responsive to determining that the additional memory page cannot be created for the current level, setting a next-deeper level of the allocator index as the current level and choosing a branch of the current level according to a next-most-significant byte of the lowest key value of the new leaf node.

4. The method according to claim 1, wherein determining the particular one of the memory pages in which to store the new leaf node comprises performing, as each of the leaf nodes is added to the primary index as a new leaf node:

determining a lowest key value of the one or more key values stored in the new leaf node;

performing a memory allocation analysis to determine in which of the memory pages to store the new leaf node to achieve a loose physical clustering of the leaf nodes in the memory pages, based upon a prefix of the determined lowest key value;

storing the new leaf node in the determined memory page; and updating a field of the determined memory page as necessary to ensure that the field represents the lowest key value of all leaf nodes stored in the determined memory page.

5. The method according to claim 1, wherein checkpointing the rows comprises:

copying changed ones of the rows to a checkpoint buffer stored in the memory;

copying, from the leaf node corresponding to each of the changed ones, the respective memory address to an entry in a row address translation table stored in the memory, the entry corresponding to the each changed one;

writing the rows from the checkpoint buffer to at least one of the first ones of the storage pages;

adding, to the entry in the row address translation table that corresponds to each changed one, an indication of a particular one of the first ones of the storage pages in which the each one was written; and copying the row address translation table to the checkpoint image.

6. The method according to claim 5, wherein checkpointing the rows further comprises:

creating a disk address array, the disk address array comprising a plurality of entries, each of the entries pointing to a different one of the first ones of the storage pages to which the writing writes any of the rows; and the added indication in the entry that corresponds to each changed one comprises an offset value relative to a beginning of the disk address array, the offset value indicating one of the plurality of entries within the disk address array that points to the different one at which the corresponding changed one was written.

7. The method according to claim 1, wherein checkpointing the primary index comprises:

copying changed ones of the memory pages to a checkpoint buffer stored in the memory;

storing, for each of the changed ones, an address of the memory page to an entry in a leaf page address translation table stored in the memory, the entry corresponding to the each changed one;

writing the changed ones in the checkpoint buffer to at least one of the second ones of the storage pages;

adding, to the entry in the leaf page address translation table that corresponds to each changed one, an indication of a particular one of the second ones of the storage pages in which the each one was written; and copying the leaf page address translation table to the checkpoint image.

* * * * *